Oct. 16, 1934.  G. S. THURMAN ET AL  1,977,158
METHOD OF PREPARING A PLASTIC COMPOSITION FOR THE MANUFACTURE OF
CONDUITS AND OTHER ARTICLES OF MANUFACTURE BY EXTRUSION
Filed Sept. 10, 1930
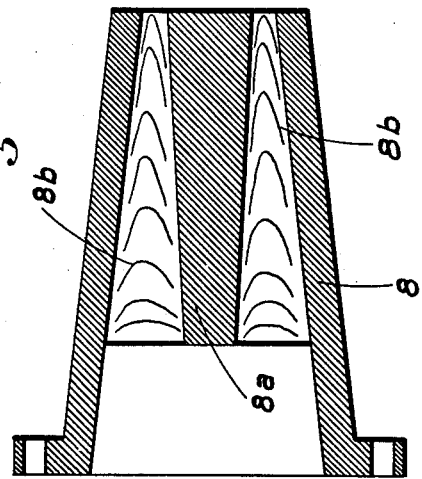
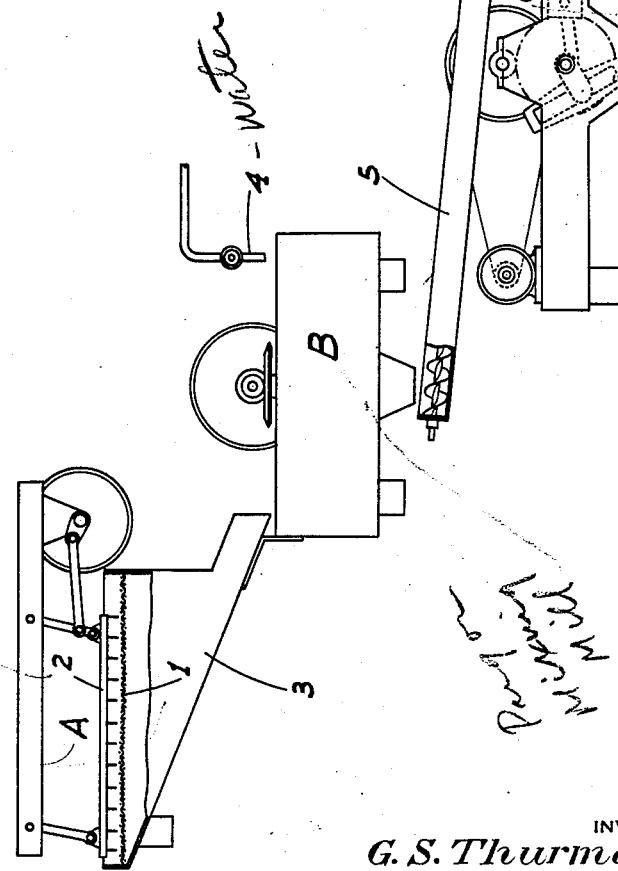
INVENTORS
G. S. Thurman
and K. T. Romie
BY
ATTORNEY Patented Oct. 16, 1934

1,977,158

UNITED STATES PATENT OFFICE 1,977,158

METHOD OF PREPARING A PLASTIC COMPOSITION FOR THE MANUFACTURE OF CONDUITS AND OTHER ARTICLES OF MANUFACTURE BY EXTRUSION

George S. Thurman and Karl T. Romie, Oakland, Calif., assignors to Fireproof Wall Company, Oakland, Calif., a corporation Application September 10, 1930, Serial No. 481,078

8 Claims. (Cl. 25—155)

This invention relates to the production of articles of manufacture from plastic compositions by extrusion. As at present intended the method is particularly directed towards the preparation of a plastic composition for the manufacture of tubular material, particularly vents for gas furnaces and internal pressure pipes where unusual strength is necessary which cannot be secured by ordinary practice. Undoubtedly however the prepared plastic composition may later be found useful in the production of other similar articles of manufacture.

In connection with the vents for gas furnaces it has heretofore been found to be extremely difficult to secure an effective and economical article for this purpose. The fumes themselves have a disintegrating effect on most materials, the greatest effect in this regard being had in cases of condensation, which results in a corrosive acid which has been found to be very destructive to the conduit. Copper pipe is extensively used but does not withstand the chemical action for more than a few years and is extremely expensive. Terra cotta and concrete pipes are used in some instances, but to secure the required strength for handling, the walls of these must be made relatively thick, which results in making them cumbersome and expensive to install. Furthermore inasmuch as they are very lacking in strength it is difficult to make tight joints. For this reason ordinances are in existence in many cities which require them to be surrounded with a casing of galvanized iron or similar material, or else that they be used as a lining for flues regularly built of brick or equivalent material. In any case however the installation is too expensive to encourage the use of the same.

The ideal conduit to be used as a gas furnace vent is one which will resist the chemical action described and which is also of sufficient inherent strength and lightness to permit of horizontal or vertical installation without the necessity of using a metal cover. Furthermore it is quite desirable that the conduit should have a sufficient inherent strength as to permit of its being manufactured in a relatively thin wall surface so that the conduit will be light and not difficult to install.

In the case of conduits used as conductors of fluids which subject them to internal pressure metal pipe has been the common material used for this purpose. The expense however is quite great and in cases of underground installation the pipe is subject to corrosive chemical action such as that caused by alkalis in the soil.

A satisfactory conduit for use both as a gas furnace vent and as an internal pressure conduit has been made of cement and asbestos, but up to the present time it has not been found possible to manufacture conduits of these materials at the low price necessary to develop a ready demand for the same, since in the methods heretofore developed in the manufacture thereof the conduits can only be manufactured at large central plants, which necessitates heavy transportation charges being incurred in delivering the material to points not immediately adjacent the plants.

After a great deal of experimentation in the manufacture of conduits from cement and asbestos in an attempt to develop a method by which they can be manufactured at a sufficiently low cost as to encourage the commercial development thereof we have developed the present method which is the subject matter of this application for patent.

Our method, as will be later described, is such that the manufacture of the conduits may be carried on by means of relatively inexpensive equipment and which can be readily installed at points where the product is to be used, thus saving transportation charges. The materials used are common to most localities and in the majority of localities can be obtained as cheaply in one case as in another. In addition to the less elaborate equipment required the method of manufacture is in itself much simpler than those heretofore carried on, and as a result the product can be produced very cheaply.

In carrying out our improved method we propose to make the conduits primarily of cement and asbestos mixed together, and to so prepare the same in such a form as to permit of the conduits being formed by extruding the plastic composition through a die. To accomplish this it is necessary to use a certain quantity of clay or similar plastic material in the mix. The sole purpose of the clay is to secure plasticity whereby the composition may be readily passed through the extrusion die, and since the clay or like material itself tends to lessen the density and strength of the finished product we have developed the use of a minimum amount thereof. This is particularly true in the case where the conduits are to be used as gas vents, since in this instance it is particularly necessary to use a material with as great a density as possible in order to resist absorption. Gas vents are at times subjected to considerable heat and a large moisture content might lead to checking and cracking, due to the moisture expansion under the influence of heat. In conduits used for this purpose therefore the asbestos serves a double purpose in resisting the chemical action and also in reinforcing the cement so as to produce a product of great strength and resiliency. It is a general rule in making cement mixtures to use as little water as possible, it having been found that the less water the greater is the strength of the resultant product. In our proposed mixture we would therefore use water not to exceed 20% by volume. With this amount of water we have found that by using ordinary methods it is impossible to effect an intimate mixture of the cement, asbestos, and clay; since when mixed according to such ordinary methods and passed through the extrusion die the composition tends to disintegrate rather than being compacted into a coherent and homogeneous mass as is necessary. We have found however that by taking the mixture and first thoroughly mixing it in dry form, then adding the water and mixing it as thoroughly as possible in an ordinary concrete mixer and then running it through an extrusion machine a number of times under pressure, that this brings about a thorough mixture of the different parts and forms it into a smooth plastic mass which finally permits of extruding the material through the final shaping die in the tubular form desired and in a compact, coherent and homogeneous form. We have found that in order to secure the necessary cohesion or plasticity of the material and the proper strength of the resultant product it is absolutely necessary to follow this method of repeatedly mixing the ingredients of the plastic composition together under pressure.

The pressure developed and the successive applications thereof to the mixture must be very substantial in order that not only the moisture but the minute particles of cement shall be forced thoroughly through asbestos fiber. In other words there must be a most thorough mixing of the cement and asbestos or the proper results are not obtainable. In our method the thorough cohesion of the mass is attained by the repeated mixing and application of pressure.

In putting the material through the extrusion machine preparatory to the final manufacture of the conduit, the flow of the material is first such as to cause one part of the stream to flow faster than another part. This action causes laminations and produces a rubbing together of the same under the pressure exerted. Repeated extrusions therefore cause this rubbing together action to finally accomplish the necessary intimate and complete mixing of the mass together so that it may be passed through the final shaping die without laminating or disintegrating.

In order to secure the best results from the asbestos in the mix it is, of course, necessary that it be properly separated and well distributed through the mass. Owing to the limited amount of water used with our process it is not possible to well separate and distribute the same by the use of a large relative percentage of water as is done in other processes. Therefore we assemble the cement, clay and asbestos in a preliminary dry form and cause this to pass through a coarse screen by moving the mass back and forth over the screen. This brings about a gradual mixing of the dry finely ground cement and clay with the asbestos as it passes through the screen. As the fibers of the asbestos are separated by this process the dry, powdered material adheres to all portions of the fibers which are exposed and on the subsequent application of the water permits of a more thorough mixing of the ultimate product.

While we have specified that the pressure is attained by repeated extrusions of the material through the extruding machine, which is at present the preferred form of apparatus for carrying out the method, nevertheless it is possible to conceive of the pressure being applied by other mechanisms, hence we do not wish to be understood as limiting ourselves to any particular machinery or form by which the pressure is applied.

While of course we do not wish to be understood as being confined to any particular percentage of the different elements used in the composition treated and prepared as above indicated, nevertheless as one example will say that we have found so far that the most practicable formula for the composition to be used and prepared and which gives the best finished product is as follows:

| | Parts by volume |
|---|---|
| Cement | 10 |
| Clay | 3 to 4 |
| Asbestos (without compression) | 9 |

As already stated, it is essential to keep the clay content as low as possible, and at the same time use enough to permit the necessary plasticity of the composition in order to allow it to easily slip through the extruding die. In actual practice it may be found at times necessary to increase the clay content to an amount above that indicated in order to get the most efficient extrusion through the die.

We use the term "dry mix" in our claims as it is usually used in the art of plastics, i. e. as defining a mixture of the dry aggregate with just enough liquid to hold the aggregate together.

Our improved method may properly be carried out through the instrumentality of different types of mechanisms. As an illustration, one typical assembly of mechanism useful in the practicing of such method is disclosed in the accompanying drawing in which:

Figure 1 shows a side elevation of one example of cooperating equipment through the medium of which the several steps of our improved method may be carried out, some of the parts in the figure being shown partly broken out and in section.

Figure 2 is a sectional view of the extrusion issue tube showing the manner in which the mass rubs together in laminated relation as it is forced under pressure through the extrusion die.

Referring now more particularly to the characters of reference on the drawing, the letter A designates generally the screening mechanism. Here the dry ingredients may be disposed on the screen 1 and raked back and forth by the rake 2 driven by any suitable power. Thus the finely divided dry powdered material will be thoroughly mixed with and adhered to all portions of the asbestos fibers.

The dry material then passes through a chute 3 to the pug mill or other mixing mill B. Here the desired amount of water may be added through a controlled supply pipe 4 and thoroughly mixed with the dry ingredients to establish the dry mix discussed in the description of the method.

From the mixing mill B the dry mix is discharged onto a suitable conveyor 5 whence it is carried and discharged into the pressure mixing machine indicated generally on the drawing by the letter C. In the present instance this pressure mixing machine is disclosed as a reciprocating plunger type of extruding device. The dry mix leaves the conveyor 5 and enters the machine C through a hopper 6. A reciprocating plunger 7 forces it through the contracted funnel shaped issue tube 8 from which it is received in a reservoir 9. After a batch has been pressed through the tube 8 it is returned by a conveyor 10 to the hopper 6 whereupon the extruding operation is repeated. This cycle is continued until the batch is thoroughly mixed and converted into a coherent and homogeneous mass so that it can be moved through the shaping die without disintegrating or separating.

In Figure 2 is shown the issue tube 8 in section to illustrate how the mass is subjected to a rubbing and mixing action due to its tending to laminate as it is forced through the tube. The outer walls of the issue tube 8 converge as shown and also there is a tapered inner core 8a, the walls of which core taper inwards. Thus the inner and outer walls of the opening through the tube converge toward its outer end. Therefore as the mass is pressed through the opening the friction of the same against the converging walls causes the outside of the mass to move slower than the center thus causing the outside to laminate backward over the center as shown by the diagrammatic lines 8b to effect the rubbing action referred to in the description of the method.

It is of course to be understood that we do not consider ourselves limited to the use of the above described structures in carrying out our new method as other and different structures may be made useful in practicing the method without in any way departing from the spirit of the invention.

Having thus described our invention what we claim as new and useful and desire to secure by Letters Patent is:

1. The method of preparing a composition for the manufacture of articles by extrusion which comprises mixing a setting material, a fibrous material and a clay in dry form, adding a liquid, agitating the same to the consistency of a dry mix, and then alternately mixing and applying pressure to the mix until it is a coherent and homogeneous mass.

2. The method of preparing a composition for the manufacture of articles by extrusion which comprises mixing a cement, an asbestos, and a clay in dry form, adding a liquid, agitating the same to the consistency of a dry mix, and then alternately mixing and applying pressure to the mix until it is a coherent and homogeneous mass.

3. The method of preparing a plastic composition of cement and asbestos for use in producing articles of manufacture, comprising establishing a dry mix of such material, and subjecting the same to pressure while mixing sufficient to force it into a coherent and homogeneous mass.

4. The method of preparing a composition for the manufacture of articles by extrusion comprising establishing a dry mix of cement, asbestos and clay, extruding the mix through an orifice under pressure and repeating this latter step until the mix becomes a coherent, homogeneous mass.

5. The herein described method comprising the putting together of cement, clay or the like, and asbestos in dry form, moving these dry materials back and forth over a screen so that as the same pass through the screen the dry powdered cement and clay will adhere to the asbestos fibers, then mixing the aggregate mass with water to the consistency of a "dry mix" and then repeatedly mixing and applying pressure to this dry mix until it is a coherent and homogeneous mass, and then extruding the final mass through a shaping die to shape it to desired form.

6. That method of producing conduit made up of clay, asbestos and cement which consists in the steps of first establishing a relatively dry mix of such ingredients, including subjecting the same to pressure while mixing until the same is formed into a coherent, homogeneous mass, and then extruding such mass through an extruding die to form the conduit.

7. That method of preparing a composition for the manufacture of articles by extrusion which comprises mixing a cement, an asbestos and a clay in dry form, adding a liquid thereto in a quantity only sufficient to form a damp but initially incohesive mix, and then further mixing and applying pressure to such initial mix until it becomes a coherent and homogeneous mass.

8. That method of preparing a composition for the manufacture of articles by extrusion which comprises establishing an initial mix of a cement, an asbestos and a clay in dry form with a liquid added thereto in an amount not to exceed approximately twenty per cent of the whole by volume, and then further mixing and applying pressure to the initial mix until it becomes a coherent and homogeneous mass.

GEORGE S. THURMAN.
KARL T. ROMIE.